(12) United States Patent
Suciu et al.

(10) Patent No.: US 10,830,130 B2
(45) Date of Patent: *Nov. 10, 2020

(54) GEARED TURBOFAN WITH THREE TURBINES ALL COUNTER-ROTATING

(71) Applicant: Raytheon Technologies Corporation, Farmington, CT (US)

(72) Inventors: Gabriel L. Suciu, Glastonbury, CT (US); Frederick M. Schwarz, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/843,012

(22) Filed: Dec. 15, 2017

(65) Prior Publication Data

US 2018/0128168 A1 May 10, 2018

Related U.S. Application Data

(63) Continuation of application No. 14/689,337, filed on Apr. 17, 2015, now abandoned, which is a
(Continued)

(51) Int. Cl.
*F01D 1/10* (2006.01)
*F02C 3/107* (2006.01)
(Continued)

(52) U.S. Cl.
CPC .............. *F02C 3/107* (2013.01); *F01D 1/10* (2013.01); *F01D 1/26* (2013.01); *F01D 5/06* (2013.01);
(Continued)

(58) Field of Classification Search
CPC .. F01D 1/10; F01D 15/12; F02C 3/073; F02C 3/067; F02C 3/107; F05D 2260/40311; F05D 2250/44
See application file for complete search history.

(56) References Cited

U.S. PATENT DOCUMENTS 2,936,655 A 5/1960 Peterson et al.
3,021,731 A 2/1962 Stoeckicht
(Continued)

FOREIGN PATENT DOCUMENTS

EP 1703085 9/2006
EP 2071139 A2 6/2009
(Continued)

OTHER PUBLICATIONS

Kurzke, J. (2008). Preliminary Design, Aero-engine design: From state of the art turbofans towards innovative architectures. pp. 1-72.
(Continued)

*Primary Examiner* — Ninh H. Nguyen
(74) *Attorney, Agent, or Firm* — Carlson, Gaskey & Olds, P.C.

(57) ABSTRACT

A gas turbine engine has a fan rotor, a first compressor rotor and a second compressor rotor. The second compressor rotor compresses air to a higher pressure than the first compressor rotor. A first turbine rotor drives the second compressor rotor and a second turbine rotor. The second turbine drives the compressor rotor. A fan drive turbine is positioned downstream of the second turbine rotor. The fan drive turbine drives the fan through a gear reduction. The first compressor rotor and second turbine rotor rotate as an intermediate speed spool. The second compressor rotor and first turbine rotor together as a high speed spool. The high speed spool and the fan drive turbine configured to rotate in the same first direction. The intermediate speed spool rotates in an opposed, second direction.

15 Claims, 2 Drawing Sheets

Related U.S. Application Data continuation of application No. 13/455,198, filed on Apr. 25, 2012, now Pat. No. 9,074,485.

(51) Int. Cl.

| | | |
|---|---|---|
| *F02C 3/073* | (2006.01) | |
| *F02C 3/067* | (2006.01) | |
| *F01D 1/26* | (2006.01) | |
| *F01D 5/06* | (2006.01) | |
| *F01D 15/12* | (2006.01) | |
| *F02C 3/06* | (2006.01) | |

(52) U.S. Cl.
CPC ............... *F01D 15/12* (2013.01); *F02C 3/06* (2013.01); *F02C 3/067* (2013.01); *F02C 3/073* (2013.01); *F05D 2220/32* (2013.01); *F05D 2250/44* (2013.01); *F05D 2260/4031* (2013.01); *F05D 2260/40311* (2013.01)

(56) References Cited

U.S. PATENT DOCUMENTS

| | | | |
|---|---|---|---|
| 3,250,512 A | 5/1966 | Petrie | |
| 3,287,906 A | 11/1966 | McCormick | |
| 3,352,178 A | 11/1967 | Lindgren et al. | |
| 3,526,092 A | 9/1970 | Steel | |
| 3,527,054 A | 9/1970 | Hemsworth | |
| 3,620,021 A * | 11/1971 | Lawrie | F02K 3/06 60/226.1 |
| 3,673,802 A * | 7/1972 | Krebs | F02C 3/067 60/226.1 |
| 3,729,957 A | 5/1973 | Petrie et al. | |
| 3,754,484 A | 8/1973 | Roberts | |
| 3,861,139 A | 1/1975 | Jones | |
| 3,892,358 A | 7/1975 | Gisslen | |
| 4,130,872 A | 12/1978 | Harloff | |
| 4,289,360 A | 9/1981 | Zirin | |
| 4,304,522 A | 12/1981 | Newland | |
| 4,693,616 A | 9/1987 | Rohra et al. | |
| 4,827,712 A * | 5/1989 | Coplin | F02K 3/06 415/210.1 |
| 4,916,894 A | 4/1990 | Adamson et al. | |
| 5,010,729 A | 4/1991 | Adamson et al. | |
| 5,160,251 A | 11/1992 | Ciokajlo | |
| 5,361,580 A | 11/1994 | Ciokajlo et al. | |
| 5,388,964 A | 2/1995 | Ciokajlo et al. | |
| 5,433,674 A | 7/1995 | Sheridan et al. | |
| 5,447,411 A | 9/1995 | Curley et al. | |
| 5,524,847 A | 6/1996 | Brodell et al. | |
| 5,634,767 A | 6/1997 | Dawson | |
| 5,778,659 A | 7/1998 | Duesler et al. | |
| 5,806,303 A | 9/1998 | Johnson | |
| 5,857,836 A | 1/1999 | Stickler et al. | |
| 5,915,917 A | 6/1999 | Eveker et al. | |
| 5,975,841 A | 11/1999 | Lindemuth et al. | |
| 6,223,616 B1 | 5/2001 | Sheridan | |
| 6,318,070 B1 | 11/2001 | Rey et al. | |
| 6,647,707 B2 | 11/2003 | Dev | |
| 6,732,502 B2 | 5/2004 | Seda et al. | |
| 6,814,541 B2 | 11/2004 | Evans et al. | |
| 6,883,303 B1 | 4/2005 | Seda | |
| 7,021,042 B2 * | 4/2006 | Law | C23C 14/0623 384/913 |
| 7,219,490 B2 | 5/2007 | Dev | |
| 7,299,621 B2 | 11/2007 | Bart et al. | |
| 7,451,592 B2 | 11/2008 | Taylor et al. | |
| 7,490,460 B2 | 2/2009 | Moniz et al. | |
| 7,591,754 B2 | 9/2009 | Duong et al. | |
| 7,632,064 B2 | 12/2009 | Somanath et al. | |
| 7,694,505 B2 | 4/2010 | Schilling | |
| 7,765,789 B2 | 8/2010 | Johnson | |
| 7,824,305 B2 | 11/2010 | Duong et al. | |
| 7,828,682 B2 | 11/2010 | Smook | |
| 7,926,260 B2 | 4/2011 | Sheridan et al. | |
| 8,015,798 B2 | 9/2011 | Norris et al. | |
| 8,205,432 B2 | 6/2012 | Sheridan | |
| 8,297,916 B1 | 10/2012 | McCune et al. | |
| 9,074,485 B2 * | 7/2015 | Suciu | F01D 1/26 |
| 9,133,729 B1 | 9/2015 | McCune et al. | |
| 9,297,917 B2 | 3/2016 | Mah et al. | |
| 9,631,558 B2 | 4/2017 | McCune et al. | |
| 2003/0163983 A1 | 9/2003 | Seda et al. | |
| 2003/0163984 A1 | 9/2003 | Seda et al. | |
| 2006/0090451 A1 | 5/2006 | Moniz et al. | |
| 2007/0201974 A1 | 8/2007 | Dev | |
| 2007/0265133 A1 | 11/2007 | Smook | |
| 2010/0040462 A1 | 2/2010 | Praisner et al. | |
| 2010/0105516 A1 | 4/2010 | Sheridan et al. | |
| 2010/0148396 A1 | 6/2010 | Xie et al. | |
| 2010/0154383 A1 | 6/2010 | Ress, Jr. | |
| 2010/0331139 A1 | 12/2010 | McCune | |
| 2011/0030387 A1 | 2/2011 | Kumar et al. | |
| 2011/0081237 A1 | 4/2011 | Durocher et al. | |
| 2013/0287575 A1 | 10/2013 | McCune et al. | |

FOREIGN PATENT DOCUMENTS

| | | |
|---|---|---|
| EP | 2177735 A2 | 4/2010 |
| EP | 2532841 | 12/2012 |
| EP | 2532858 | 12/2012 |
| EP | 2551489 | 1/2013 |
| EP | 2809931 | 7/2016 |
| FR | 2912181 | 8/2008 |
| GB | 1516041 | 6/1978 |
| GB | 2041090 | 9/1980 |
| WO | 2007038674 | 4/2007 |
| WO | 2013116262 | 8/2013 |
| WO | 2014047040 | 3/2014 |

OTHER PUBLICATIONS

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Datasheet. CF6-80C2 high-bypass turbofan engines. Retreived from https://geaviation.com/sites/default/files/datasheet-CF6-80C2.pdf.

Salemme, C.T. and Murphy, G.C. (1979). Metal spar/superhybrid shell composite fan blades. Prepared for NASA. NASA-CR-159594. Aug. 1979. pp. 1-127.

Press release. The GE90 engine. Retrieved from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Winn, A. (Ed). (1990). Wide Chord Fan Club. Flight International, 4217(137). May 23-29, 1990. pp. 34-38.

About GasTurb. Retrieved Jun. 26, 2018 from: http://gasturb.de/about-gasturb.html.

Kurzke, J. (2001). GasTurb 9: A porgram to calculate design and off-design performance of gas turbines. Retrieved from: https://www.scribd.com/document/92384867/GasTurb9Manual.

Tummers, B. (2006). DataThief III. Retrieved from: https://datathief.org/DatathiefManual.pdf pp. 1-52.

Manual. Student's Guide to Learning SolidWorks Software. Dassault Systemes—SolidWorks Corporation. pp. 1-156.

Macisaac, B. and Langston, R. (2011). Gas turbine propulsion systems. Chichester, West Sussex: John Wiley & Sons, Ltd. pp. 260-265.

Datasheet. CFM56-5B for the Airbus A320ceo family and CFM56-7B for the Boeing 737 family. https://www.cfmaeroengines.com/.

Turner, M. G., Norris, A., and Veres, J.P. (2004). High-fidelity three-dimensional simulation of the GE90. NASA/TM-2004-212981. pp. 1-18.

Petition for Inter Partes Review of U.S. Pat. No. 9,695,751. *General Electric Company*, Petitioner, v. *United Technologies Corporation*, Patent Owner. IPR2018-01442. Filed Jul. 24, 2018.

(56) References Cited

OTHER PUBLICATIONS

Third Party Observations for European Patent Application No. 14155460.0 mailed Oct. 29, 2018 by Rolls Royce.

NASA, Engine Weight Model, Glenn Research Center, retrieved from, http://www.grc.nasa.gov/WWW/K-12/airplane/turbwt.html, Mar. 11, 2016.

Singapore Search Report for Singapore Patent Application No. 11201406230T dated Jul. 31, 2015.

Mattingly, J.D. (2002). Aircraft engine design. American Institute of Aeronautics and Astronautics Inc. Jan. 2002. pp. 292-322.

Product Brochure. BR710. Rolls-Royce. Copyright 2008. pp. 1-4.

Praisner, T.J., Grover, E., Mocanu, R., Jurek, R., and Gacek, R. (2010). Predictions of unsteady interactions between closely coupled HP and LP turbines with co- and counter-rotation. Proceedings of ASME Turbo Expo 2010. Jun. 14-18, 2018. Glasgow, UK. p. 1-10.

Pratt & Whitney PW8000. Jane's Aero-Engines. Jane's by IHS Markit. Sep. 30, 2010.

Annexe Mesures—Methodologie de mesure et de calcul. Cited in: Notice of Opposition for European Patent No. 2809932 dated Oct. 1, 2018.

Fowler, T.W. Ed. (1989). Jet engines and propulsion systems for engineers. GE Aircraft Engines. Training and Educational Development and the University of Cincinnati for Human Resource Development. pp. 1-516.

Walsh, P.P. and Fletcher, P. (2004). Gas turbine performance, 2nd Edition. Oxford, UK: Blackwell Science. pp. 1-658.

ASME International Gas Turbine Institute. (Apr. 2013). Trends in the global energy supply and implications for the turbomachinery industry. Global Gas Turbine News, vol. 53(2). pp. 49, 53.

Halle, J.E. and Michael, C.J. (1984). Energy efficient engine fan component detailed design report. NASA-CR-165466. pp. 1-135.

Fitzpatrick, G.A., Broughton, T. (1987). The Rolls-Royce wide chord fan blade. Rolls-Royce Reporting. Mar. 19, 1987. pp. 1-19.

Fitzpatrick, G.A. and Broughton, T. (1988). Diffusion bonding aeroengine components. Def Scie J vol. 38(4). Oct. 1998. pp. 477-485.

(1987). Wide-chord fan—12 years of development. Aircraft Engineering and Aerospace Technology. vol. 59, issue 7. pp. 10-11. Retrieved Jul. 31, 2008 from: https://doi.org/10.1108/eb036471.

Product Brochure. TFE731 Engines: A new generation meeting your highest expectations for reliability, cost of ownership and performance. Allied Signal Aerospace. Copyright 1996. pp. 1-10.

Engine Alliance GP7200. Jane's Aero-Engines. Jane's by IHS Markit. Jul. 12, 2010.

General Electric GE90. Jane's Aero-Engines. Jane's by IHS Markit. Nov. 1, 2010.

Pratt & Whitney PW2000. Jane's Aero-Engines. Jane's by IHS Markit. Sep. 29, 2010.

Treager, I.E. (1995). Aircraft gas turbine engine technology, 3rd Edition. GLENCOE Aviation Technology Series. McGraw-Hill.

Pratt & Whitney PW6000. Jane's Aero-Engines. Jane's by IHS Markit. Nov. 22, 2010.

United Technologies Pratt & Whitney. Jane's Aero-Engines. Jane's by IHS Markit. Aug. 30, 2000.

General Electric CF34. Jane's Aero-Engines. Jane's by IHS Markit. Jul. 26, 2010.

CFM International CFM56. Jane's Aero-Engines. Jane's by IHS Markit. Jan. 31, 2011.

U.S. Department of Transportation: Federal Aviation Administration Type Certificate Data Sheet No. E00064EN. Dated: Nov. 24, 2006. p. 1-5.

Dr. Raymond G. Tronzo v. Biomet Inc., 156 F.3d 1154 (1998).

Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.

WIKIPEDIA. Stiffness. Retrieved Jun. 28, 2018 from: https://en.wikipedia.org/wiki/Stiffness.

Attestation of Didier Escure signed Sep. 17, 2018. Cited in: Notice of Opposition for European Patent No. 2809932 mailed Oct. 1, 2018.

Fanchon, J-L. (1994). Guide de sciences et technologies industrielles. Paris, France: Nathan, AFNOR. pp. 359-360.

Le Borzec, R. (1992). Reducteurs de vitesse a engrenages. Techniques de l'Igenieur. Nov. 10, 1992. pp. 1-36.

U.S. Appl. No. 61/494,453, filed Jun. 8, 2011 titled Geared Engine Flexible Mount Arrangement.

Pratt and Whitney PW1100G geared turbofan engine. The Flying Engineer. Retrieved Nov. 4, 2017 from: http://theflyingengineer.com/flightdeck/pw1100g-gtf/.

Request for Opinion as to Validity for European Patent No. 2809922 (13778330.4) by Rolls Royce dated Feb. 6, 2019.

Annotation of Edkins, D.P., Hirschkron, R., and Lee, R. (1972). TF34 turbofan quiet engine study. Final Report prepared for NASA. NASA-CR-120914. Jan. 1, 1972. p. 92.

Annotation of Gray, D.E. (1978). Energy efficient engine preliminary design and integration studies. Prepared for NASA. NASA CR-135396. Nov. 1978. p. 70.

Decision Institution of Inter Partes Review. *General Electric Company.*, Petitioner, v. *United Technologies Corp.*, Patent Owner. IPR2018-01442. U.S. Pat. No. 9,695,751. Entered Feb. 21, 2019. pp. 1-25.

Edkins, D.P., Hirschkron, R., and Lee, R. (1972). TF34 turbofan quiet engine study. Final Report prepared for NASA. NASA-CR-120914._ Jan. 1, 1972. pp. 1-99.

Third Party Observations for European Patent Application No. 13777804.9 dated Dec. 19, 2018.

Gray, D.E. and Gardner, W.B. (1983). Energy efficient engine program technology benefit/cost study—vol. 2. NASA CR-174766. Oct. 1983. pp. 1-99.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

Wendus, B.E., Stark, D.F., Holler, R.P., and Funkhouser, M.E. (2003). "Follow-on technology requirement study for advanced subsonic transport". NASA/CR-2003-212467.

Garrett, (1987). "TFE731".

Roux, E. (2007). "Turbofan and turbojet engines database handbook". Editions Elodie Roux. Blagnac: France. p. 41-42; p. 465; p. 468-469.

Kurzke, J. (2009). Fundamental differences between conventional and geared turbofans. Proceedings of ASME Turbo Expo: Power for Land, Sea, and Air. 2009, GT2009-59745, Orlando, Florida.

Mattingly, J.D. (1996). Elements of gas turbine propulsion. New York, New York: McGraw-Hill, Inc.

Riegler, C. (2007). The Geared Turbofan Technology—Opportunities, Challenged and Readiness Status. Proceedings CEAS 2007.

Waters, M.H. and Schairer, E.T. (1977). Analysis of turbofan propulsion system weight and dimensions. NASA Technical Memorandum. NASA TM-X-73. Jan. 1977. p. 199.

Willis, W.S. (1979). Quiet clean short-haul experimental engine (QCSEE) final report NASA/CR-159473 pp. 1-289.

Sweetman, B. and Sutton, O. (1998). Pratt & Whitney's surprise leap. Interavia Business & Technology, 53.621, p. 25.

Gunston, B. (Ed.) (2000). Jane's aero-engines, Issue seven. Coulsdon, Surrey, UK: Jane's Information Group Limited. pp. 510-512.

Brines, G.L. (1990). The turbofan of tomorrow. Mechanical Engineering: The Journal of the American Society of Mechanical Engineers,108(8), 65-67.

Daly, M. Ed. (2010). Jane's Aero-Engine. Issue Twenty-seven. Mar. 2010. p. 633-636.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Lynwander, P. (1983). Gear drive systems: Design and application. New York, New York: Marcel Dekker, Inc. pp. 145, 355-358.

Hill, P.G. and Peterson, C.R. (1992). Mechanics and Thermodynamics of Propulsion, Second Edition. Addison-Wesley Publishing Company. pp. 400-406.

(56) References Cited

OTHER PUBLICATIONS

Kasuba, R. and August, R. (1984). Gear Mesh Stiffness and Load Sharing in Planetary Gearing. The American Society of Mechanical Engineers. New York, NY.
Hill, P.G. and Peterson, C.R. (1970). Mechanics and Thermodynamics of Propulsion. Addison-Wesley Series in Aerospace Science. Chapter 9-4.
Leckie, F.A. and Dal Bello, D.J. (2009). Strength and stiffness of engineering systems. Mechanical Engineering Series. Springer. pp. 1-10, 48-51.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 3.14-18 and 12.7-12.21.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Reynolds, C.N. (1985). Advanced prop-fan engine technology (APET) single- and counter-rotation gearbox/pitch change mechanism. Prepared for NASA. NASA CR-168114 (vol. II). Jul. 1985. pp. 1-175.
U.S. Department of Transportation: Federal Aviation Administration Type Certificate Data Sheet No. E6WE. Dated: May 9, 2000. p. 1-9.
Honeywell Sabreliner 65 TFE731-3 to -3D Engine Upgrade Program. Oct. 2005. pp. 1-4.
Honeywell Learjet 31 and 35/36 TFE731-2 to 2C Engine Upgrade Program. Sep. 2005. pp. 1-4.
Kurzke, J. (2012). GasTurb 12: Design and off-design performance of gas turbines. Retrieved from: https://www.scribd.com/document/153900429/GasTurb-12.
Ahmad, F. And Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
English translation of Measurement and calculation methodology on TFE731-2, TFE731-3A and TFE731-3D models.
English translation of Expert certificate concerning the technical nature of the drawings used in the measurement and calculation methodology.
Declaration of Raymond Drago. In re U.S. Pat. No. 8,297,916. IPR2018-01172. Executed May 29, 2018. pp. 1-115.
Parker, R.G. and Lin, J. (2001). Modeling, modal properties, and mesh stiffness variation instabilities of planetary gears. Prepared for NASA. NASA/CR-2001-210939. May 2001. pp. 1-111.
Declaration of Courtney H. Bailey. In re U.S. Pat. No. 8,511,605. Executed Jul. 19, 2016. pp. 1-4.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1994). Practical gear design. New York, NY: McGraw-Hill. pp. 119-124.
Daly, M. and Gunston, B. (2008). Jane's Aero-Engines. Pratt & Whitney PW8000. Issue Twenty-three.
Notice of Opposition to Patent No. EP2811120. United Technologies Corporation opposed by Rolls Royce. Issued on Apr. 12, 2018.
Petition for Inter Partes Review of U.S. Pat. No. 8,297,916. *General Electric Company*, Petitioner, v. *United Technologies Corporation*, Patent Owner. IPR2018-01171. Filed May 30, 2018.
Petition for Inter Partes Review of U.S. Pat. No. 8,297,916. *General Electric Company*, Petitioner, v. *United Technologies Corporation*, Patent Owner. IPR2018-01172. Filed May 30, 2018.
Notice of Opposition to Patent No. EP2949882. United Technologies Corporation opposed by Rolls Royce. Mailed Aug. 23, 2017.
English Translation of Notice of Opposition to Patent No. EP2811120. United Technologies Corporation opposed by Safran Aircraft Engines. Mailed Jul. 12, 2017.
English Translation of Notice of Opposition to Patent No. EP299882. United Technologies Corporation opposed by Safran Aircraft Engines. Mailed May 23, 2018.
Request for Opinion as to Validity of European Patent No. 2809922B1 (13778330.4) Observations-in-Reply mailed Apr. 3, 2019 by Rolls-Royce.
Opinion under Section 74(a) for European Patent Application No. 2809922 mailed May 9, 2019.
Statement of Appeal filed Mar. 22, 2019 by Safran in European Patent 2809931 (13743042.7).
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.
Carney, K., Pereira, M. Revilock, and Matheny, P. (2003). Jet engine fan blade containment using two alternate geometries. 4th European LS-DYNA Users Conference. pp. 1-10.
Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modem Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA echnical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.

(56) References Cited

OTHER PUBLICATIONS

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Ivchenko-Progress D-436. Jane's Aero-engines, Aero-engines-Turbofan. Feb. 8, 2012.

Ivchenko-Progress AI-727M. Jane's Aero-engines, Aero-engines-Turbofan. Nov. 27, 2011.

Ivchenko-Progress D-727. Jane's Aero-engines, Aero-engines-Turbofan. Feb. 7, 2007.

Turbomeca Aubisque. Jane's Aero-engines, Aero-engines-Turbofan. Nov. 2, 2009.

Aviadvigatel D-110. Jane's Aero-engines, Aero-engines-Turbofan. Jun. 1, 2010.

Rolls-Royce M45H. Jane's Aero-engines, Aero-engines-Turbofan. Feb. 24, 2010.

Honeywell LF502. Jane's Aero-engines, Aero-engines-Turbofan. Feb. 9, 2012.

Pratt & Whitney Aircraft Group, "Energy Efficient Engine Flight Propulsion System Preliminary Analysis and Design Report", 1979, NASA CR-159487, p. i-450.

Honeywell LF507. Jane's Aero-engines, Aero-engines-Turbofan. Feb. 9, 2012.

Honeywell TFE731. Jane's Aero-engines, Aero-engines-Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Notice of Opposition for European Patent No. 2809932 mailed Oct. 1, 2018 by Safran Aircraft Engines.

Notice of Opposition for European Patent No. 2809939 mailed Oct. 2, 2018 by Safran Aircraft Engines.

Notice of Opposition for European Patent No. 2809939 mailed Sep. 26, 2018 by Rolls-Royce.

Third Party Submission and Concise Description of Relevance of Document for U.S. Appl. No. 15/881,240 mailed Aug. 28, 2018.

Supplementary European Search Report for European Application No. 13823513.0 completed Oct. 20, 2015.

International Search Report and Written Opinion for corresponding PCT Application No. PCT/US2013/037674 completed on Feb. 5, 2014.

International Preliminary Report on Patenability for corresponding PCT Application No. PCT/US2013/037674, dated Nov. 6, 2014.

Notice of Opposition of European Patent No. 2834469 mailed Mar. 27, 2019 by Safran Aircraft Engines.

Rolls-Royce Trent 900. Jane's Aero-Engines. Jane's by IHS Markit. Feb. 8, 2012.

Rolls-Royce Trent XWB. Jane's Aero-Engines. Jane's by IHS Markit. Mar. 6, 2012.

The jet engine. Rolls-Royce plc. 5th Edition. 1996. pp. 48.

Gas turbine technology: Introduction to a jet engine. Rolls-Royce plc. Dec. 2007.

Bradley, A. (2010). Presentation: Engine design for the environment. Rolls-Royce. RAeS-Hamburg. Jun. 24, 2010.

Response to Holder's Response. European Patent No. 2949882 dated Mar. 12, 2019 by Safran Aircraft Engines.

Decision of the Opposition Division. European Patent No. 2949882 mailed Nov. 26, 2018.

Product Brochure. Garrett TFE731. Allied Signal. Copyright 1987. pp. 1-24.

Waters, M.H. and Schairer, E.T. (1977). Analysis of turbofan propulsion system weight and dimensions. NASA Technical Memorandum. Jan. 1977. pp. 1-65.

Gray, D.E. and Gardner, W.B. (1983). Energy efficient engine program technology benefit/cost study—vol. 2. NASA CR-174766. Oct. 1983. pp. 1-118.

Product Brochure. The ALF 502R turbofan: technology, ecology, economy. Avco Lycoming TEXTRON.

Attestation of Philippe Pellier signed Apr. 12, 2017.

Annex to the Notice un Article 94(3) EPC issued by the Examination Division. European Patent Application No. 13837107.5 mailed Jan. 25, 2019.

Holder's Response to Written Opinion dated Sep. 29, 2015. European Patent Application No. 15175205.2 (2949882) dated Jun. 1, 2016.

Mattingly, J.D. (1996). Elements of gas turbine propulsion. New York, New York: McGraw-Hill, Inc. pp. 1-18, 50-62, 85-87, 95-104, 121-123, 223-234, 242-245, 278-285, 303-309, 323-326, 462-479, 517-520, 563-565, 630-632, 568-670, 673-675, 682-685, 697-705, 726-727, 731-733, 802-805, 828-830, 862-864, and 923-927.

Notice of Opposition of European Patent No. 2949881 mailed May 28, 2019 by Safran Aircraft Engines.

Notice of Opposition of European Patent No. 2949881 mailed May 28, 2019 by Rolls-Royce.

Summons to Attend Oral Proceedings for European Patent Application No. 13743283.7 dated May 28, 2019.

Response to Statement of Grounds of Appeal from the Patent Holder for European Patent No. 2809931 by Safran Aircraft Engine dated Aug. 21, 2019.

Decision of the Opposition Division for European Patent No. 2811120 (14155460.0) mailed Jan. 15, 2020.

(56) References Cited

OTHER PUBLICATIONS

Third Party Observations of European Patent Application No. 18191325.2 (EP 3608515) mailed Mar. 10, 2020 by Rolls Royce.
Third Party Observations of European Patent Application No. 18191325.2 (EP 3608515) mailed Mar. 6, 2020 by Rolls Royce.
Third Party Observations of European Patent Application No. 18191333.6 (EP 3467273) mailed Mar. 9, 2020 by Rolls Royce.
Annexe Mesures—Methodologie de mesure et de calcul. STF495M-4 and STF495M-5. Cited in: Documents cited by Rolls-Royce in anticipation of Oral Proceedings for Opposition of European Patent No. 2809932 dated Jan. 20, 2020.
Brief Communication from Opponent after Oral Proceedings for European Patent Application No. 13743283.7 (2809932) by Safran Aircraft Engines dated Dec. 2, 2019.
Third Party Observations for European Patent Application No. 13777804.9 (2809940) by Rolls-Royce dated Nov. 21, 2019.
Summons to Attend Oral Proceedings for European Patent Application No. 13778330.4 (2809922) dated Dec. 2, 2019.
Summons to Attend Oral Proceedings for European Patent Application No. 13777804.9 dated Dec. 10, 2019.
Response to the Summons of Oral Proceedings for European Patent No. 3051078 by Rolls-Royce dated Oct. 17, 2019.
Response to the Summons of Oral Proceedings for European Patent No. 2949882 by Rolls-Royce dated Oct. 9, 2019.
Response to the Summons of Oral Proceedings for European Patent No. 2949882 by Safran dated Oct. 9, 2019.
Judgment Final Written Decision of the PTAB for Inter Partes Review No. IPR2018-01442. *General Electric Company*, Petitioner, v. *United Technologies Corporation*, Patent Owner. Entered Feb. 20, 2020. pp. 1-72.

\* cited by examiner

GEARED TURBOFAN WITH THREE TURBINES ALL COUNTER-ROTATING

CROSS-REFERENCE TO RELATED APPLICATION

This application is a continuation of U.S. patent application Ser. No. 14/689,337, filed Apr. 17, 2015, which is a continuation of U.S. patent application Ser. No. 13/455,198, filed Apr. 25, 2012.

BACKGROUND

This application relates to a gas turbine having three turbine sections, with one of the turbine sections driving a fan through a gear change mechanism.

Gas turbine engines are known, and typically include a compressor section compressing air and delivering the compressed air into a combustion section. The air is mixed with fuel and combusted, and the product of that combustion passes downstream over turbine rotors.

In one known gas turbine engine architecture, there are two compressor rotors in the compressor section, and three turbine rotors in the turbine section. A highest pressure turbine rotates a highest pressure compressor. An intermediate pressure turbine rotates a lower pressure compressor, and a third turbine section is a fan drive turbine which drives the fan.

SUMMARY

In a featured embodiment a gas turbine engine comprises a fan rotor, a first compressor rotor and a second compressor rotor. The second compressor rotor compresses air to a higher pressure than the first compressor rotor. A first turbine rotor is configured to drive the second compressor rotor and a second turbine rotor. The second turbine is configured to drive the first compressor rotor. A fan drive turbine is positioned downstream of the second turbine rotor and drives the fan rotor through a gear reduction. The first compressor rotor and the second turbine rotor are configured to rotate as an intermediate speed spool. The second compressor rotor and the first turbine rotor are configured to rotate together as a high speed spool. The high speed spool and the fan drive turbine are configured to rotate in the same first direction. The intermediate speed spool is configured to rotate in an opposed, second direction.

In another embodiment according to the previous embodiment, the fan rotor is driven by the gear reduction to rotate in the second direction.

In another embodiment according to any of the previous embodiments, a power density of the engine is greater than or equal to about 1.5 lbs/in³, and less than or equal to about 5.5 lbf/in³.

In another embodiment according to any of the previous embodiments, the power density is defined as a ratio of thrust produced by the engine expressed in pounds force to a volume of a turbine section incorporating each of the first turbine rotor, the second turbine rotor and the fan drive turbine rotor, expressed in cubic inches.

In another embodiment according to any of the previous embodiments, the ratio is greater than or equal to about 2.0.

In another embodiment according to any of the previous embodiments, the ratio is greater than or equal to about 4.0.

In another embodiment according to any of the previous embodiments, the thrust is sea level take-off flat-rated static thrust.

In another embodiment according to any of the previous embodiments, the fan rotor is configured to deliver a portion of air into a bypass duct and a portion of air into the first compressor rotor as core flow.

In another embodiment according to any of the previous embodiments, a mid-turbine frame is positioned between the first and second turbine rotors.

In another embodiment according to any of the previous embodiments, a turning vane is positioned between the second turbine rotor and the fan drive turbine.

In another embodiment according to any of the previous embodiments, a mid-turbine frame is positioned between the first and second turbine rotors.

In another embodiment according to any of the previous embodiments, a power density of the engine is greater than or equal to about 1.5 lbs/in³, and less than or equal to about 5.5 lbf/in³.

In another embodiment according to any of the previous embodiments, the ratio is greater than or equal to about 2.0.

In another embodiment according to any of the previous embodiments, the fan rotor is configured to deliver a portion of air into a bypass duct and a portion of air into the first compressor rotor as core flow.

In another embodiment according to any of the previous embodiments, the fan rotor is configured to deliver a portion of air into a bypass duct and a portion of air into the first compressor rotor as core flow.

In another embodiment according to any of the previous embodiments, a turning vane is positioned between the second turbine rotor and the fan drive turbine.

In another featured embodiment, a gas turbine engine comprises a fan rotor, a first compressor rotor and a second compressor rotor. The second compressor rotor compresses air to a higher pressure than the first compressor rotor. A first turbine rotor is configured to drive the second compressor rotor and a second turbine rotor. The second turbine is configured to drive the first compressor rotor. A fan drive turbine is positioned downstream of the second turbine rotor, and is configured to drive the fan rotor through a gear reduction. The first compressor rotor and the second turbine rotor rotate as an intermediate speed spool. The second compressor rotor and the first turbine rotor rotate together as a high speed spool. The high speed spool and the fan drive turbine are configured to rotate in the same, first direction, and the intermediate speed spool is configured to rotate in an opposed, second direction. The fan rotor is driven by the speed reduction to rotate in the opposed second direction. A power density of the engine is greater than or equal to about 1.5 lbf/in³, and less than or equal to about 5.5 lbf/in³. The power density is defined as a ratio of thrust produced by the engine expressed in pounds force to a volume of a turbine section incorporating each of the first turbine rotor, the second turbine rotor and the fan drive turbine rotor, expressed in cubic inches.

In another embodiment according to the previous embodiment, the ratio is greater than or equal to about 2.0.

In another embodiment according to any of the previous embodiments, the ratio is greater than or equal to about 4.0.

In another embodiment according to any of the previous embodiments, the thrust is sea level take-off flat-rated static thrust.

These and other features of the invention would be better understood from the following specifications and drawings, the following of which is a brief description.

DETAILED DESCRIPTION

Figure 1:
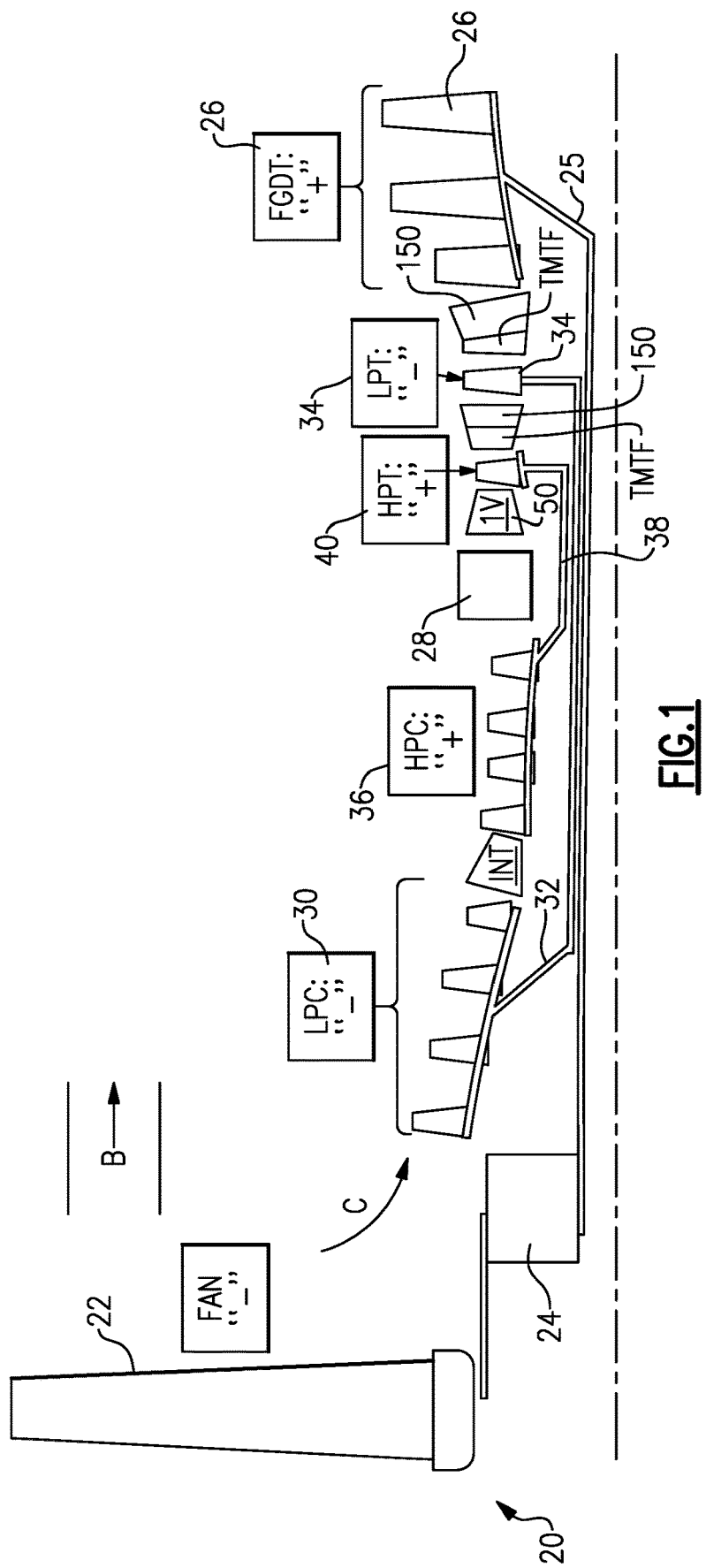
FIG. 1 schematically shows a gas turbine engine.

A gas turbine engine 20 is illustrated in FIG. 1, and incorporates a fan 22 driven through a gear reduction 24. The gear reduction 24 is driven with a low speed spool 25 by a fan/gear drive turbine ("FGDT") 26. Air is delivered from the fan as bypass air B, and into a low pressure compressor 30 as core air C. The air compressed by the low pressure compressor 30 passes downstream into a high pressure compressor 36, and then into a combustion section 28. From the combustion section 28, gases pass across a high pressure turbine 40, low pressure turbine 34, and fan/gear drive turbine 26.

A plurality of vanes and stators 50 may be mounted between the several turbine sections. In particular, as shown, the low pressure compressor 30 rotates with an intermediate pressure spool 32 and the low pressure turbine 34 in a first ("−") direction. The fan drive turbine 26 rotates with a shaft 25 in a second, opposite ("+") direction as the intermediate pressure spool 32. The speed change gear 24 may cause the fan 22 to rotate in the first ("−") direction. However, the fan rotating in the opposite direction (the second direction) would come within the scope of this invention. As is known within the art and as illustrated, a star gear arrangement may be utilized for the fan to rotate in an opposite direction as to the fan/gear drive turbine 26. On the other hand, a planetary gear arrangement may be utilized in the illustrated embodiment, wherein the two rotate in the same direction. The high pressure compressor 36 rotates with a spool 38 and is driven by a high pressure turbine 40 in the second direction ("+").

Since the turbines 26, 34 and 40 reverse rotation direction, the gases flowing between the adjacent turbine sections need only be "turned" by a small angle because the flow from one counter rotating stage enters counter-rotating stage following it at close to the proper angles. However, for some engines, including commercial engines where fuel burn efficiency is key, there may be enough of flow angle change from high power to cruise power and to descent power that the efficiency loss and fuel consumption increase justify the expense and weight of turning vanes in between the counter rotating turbines Thus, turning vanes 150 may be positioned intermediate the high pressure turbine 40, and low pressure turbine 34, and also between the low pressure turbine 34 and the fan drive turbine 26. Because the air turning angles are not great with the counter-rotating turbines widely spaced turning vanes may be incorporated into the mid-turbine frame struts themselves, where these struts exist, to provide structure to mount bearings for supporting the spools and shafts. Alternatively, the vanes may be separate from a mid-turbine frame struts and may be a separate row of stators providing precise air flow angles to the rotating turbine stage behind it.

A vane 50 is positioned to direct the gas flow into the high pressure turbine 40. Vane 50 may be a highly cambered vane.

The fan drive turbine 26 in this arrangement can operate at a higher speed than other fan drive turbine arrangements. The fan drive turbine can have shrouded blades, which provides design freedom.

The low pressure compressor may have more than three stages. The fan drive turbine has at least two, and up to six stages. The high pressure turbine as illustrated may have one or two stages, and the low pressure turbine may have one or two stages.

The above features achieve a more compact turbine section volume relative to the prior art, including both the high and low pressure turbines. A range of materials can be selected. As one example, by varying the materials for forming the low pressure turbine, the volume can be reduced through the use of more expensive and more exotic engineered materials, or alternatively, lower priced materials can be utilized. In three exemplary embodiments the first rotating blade of the fan drive turbine can be a directionally solidified casting blade, a single crystal casting blade or a hollow, internally cooled blade. All three embodiments will change the turbine volume to be dramatically smaller than the prior art by increasing low pressure turbine speed.

Due to the compact turbine section, a power density, which may be defined as thrust in pounds force produced divided by the volume of the entire turbine section, may be optimized. The volume of the turbine section may be defined by an inlet of a first turbine vane in the high pressure turbine to the exit of the last rotating airfoil in the fan/gear drive turbine 26, and may be expressed in cubic inches. The static thrust at the engine's flat rated Sea Level Takeoff condition divided by a turbine section volume is defined as power density. The sea level take-off flat-rated static thrust may be defined in pounds force, while the volume may be the volume from the annular inlet of the first turbine vane in the high pressure turbine to the annular exit of the downstream end of the last rotor section in the fan drive turbine. The maximum thrust may be sea level take-off thrust "SLTO thrust" which is commonly defined as the flat-rated static thrust produced by the turbofan at sea-level.

Figure 2:
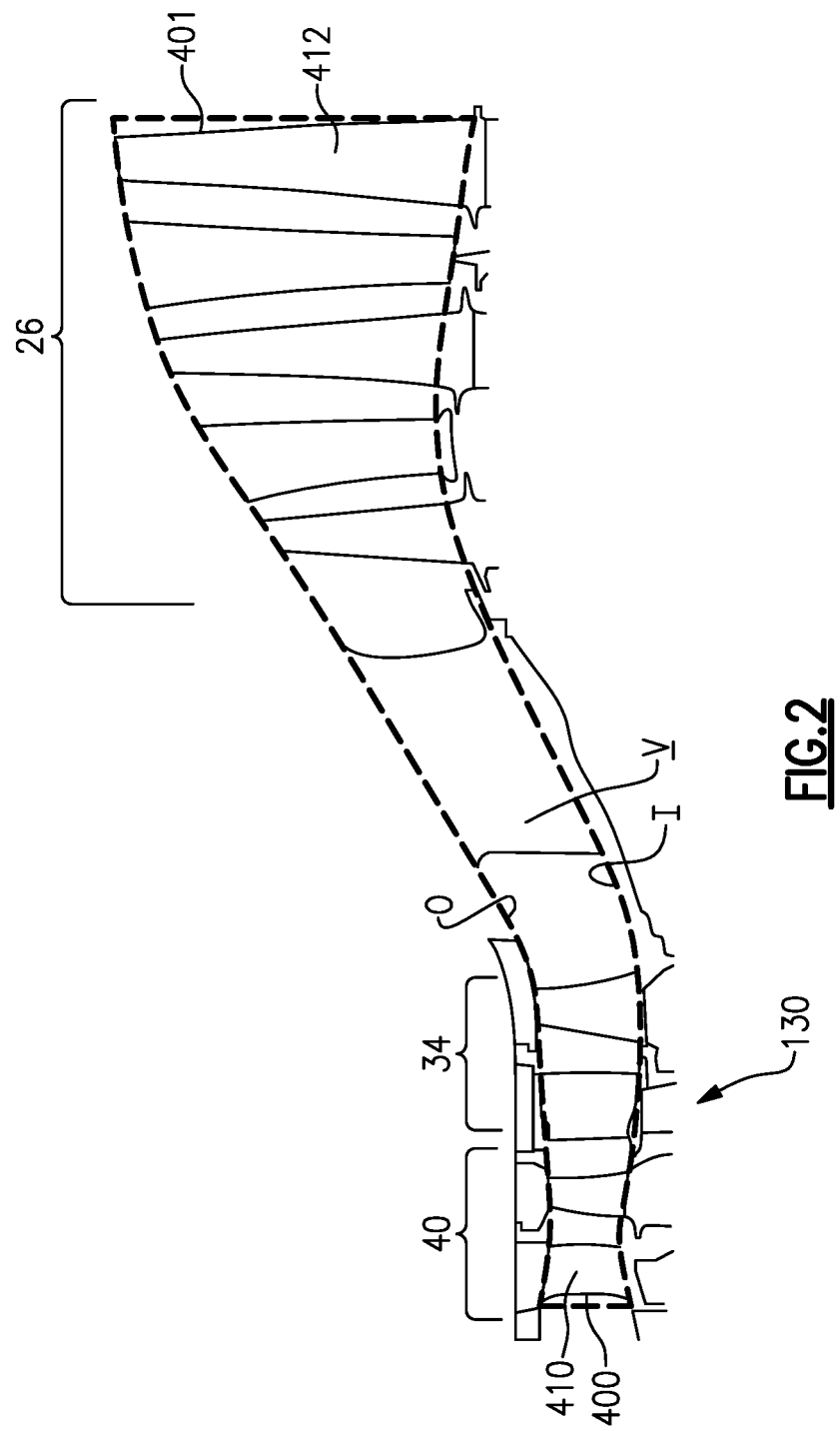
FIG. 2 shows how a volume of the turbine section can be calculated.

The volume V of the turbine section may be best understood from FIG. 2. The high pressure turbine is illustrated at 40, the low pressure turbine at 34 and the fan drive turbine at 26. The volume V is illustrated by dashed line, and extends from an inner periphery I to an outer periphery O. The inner periphery is somewhat defined by the flowpath of the rotors, but also by the inner platform flow paths of vanes. The outer periphery is defined by the stator vanes and outer air seal structures along the flowpath. The volume extends from a most upstream 400 end of the most upstream blade 410 in the high pressure turbine section 40, typically its leading edge, and to the most downstream edge 401 of the last rotating airfoil 412 in the fan drive turbine section 26. Typically, this will be the trailing edge of that airfoil 412. Mid-turbine frames and valves as illustrated in FIG. 1 may be included.

The power density in the disclosed gas turbine engine is much higher than in the prior art. Eight exemplary engines are shown below which incorporate turbine sections and overall engine drive systems and architectures as set forth in this application, and can be found in Table I as follows:

TABLE 1

| Engine | Thrust SLTO (lbf) | Turbine section volume from the Inlet | Thrust/turbine section volume (lbf/in$^3$) |
|---|---|---|---|
| 1 | 17,000 | 3,859 | 4.41 |
| 2 | 23,300 | 5,330 | 4.37 |
| 3 | 29,500 | 6,745 | 4.37 |
| 4 | 33,000 | 6,745 | 4.84 |
| 5 | 96,500 | 31,086 | 3.10 |
| 6 | 96,500 | 62,172 | 1.55 |

TABLE 1-continued

| Engine | Thrust SLTO (lbf) | Turbine section volume from the Inlet | Thrust/turbine section volume (lbf/in³) |
|---|---|---|---|
| 7 | 96,500 | 46,629 | 2.07 |
| 8 | 37,098 | 6,745 | 5.50 |

Thus, in embodiments, the power density would be greater than or equal to about 1.5 lbf/in³. More narrowly, the power density would be greater than or equal to about 2.0 lbf/in³.

Even more narrowly, the power density would be greater than or equal to about 3.0 lbf/in³.

More narrowly, the power density is greater than or equal to about 4.0 lbf/in³.

Also, in embodiments, the power density is less than or equal to about 5.5 lbf/in³.

The engine 20 in one example is a high-bypass geared aircraft engine. The bypass ratio is the amount of air delivered into bypass path B divided by the amount of air into core path C. In a further example, the engine 20 bypass ratio is greater than about six (6), with an example embodiment being greater than ten (10), the geared architecture 24 is an epicyclic gear train, such as a star of planetary gear system or other gear system, with a gear reduction ratio of greater than about 2.3 and the fan/gear drive turbine section 26 has a pressure ratio that is greater than about 5. In one disclosed embodiment, the engine 20 bypass ratio is greater than about ten (10:1), the fan diameter is significantly larger than that of the low pressure compressor section 30, and the fan/gear drive turbine section 26 has a pressure ratio that is greater than about 5:1. In some embodiments, the high pressure turbine section 40 may have two or fewer stages. In contrast, the fan/gear drive turbine section 26, in some embodiments, has between two and six stages. Further the fan/gear drive turbine section 26 pressure ratio is total pressure measured prior to inlet of fan/gear drive turbine section 26 as related to the total pressure at the outlet of the fan/gear drive turbine section 26 prior to an exhaust nozzle. The geared architecture 24 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC"). TSFC is the industry standard parameter of the rate of lbm of fuel being burned per hour divided by lbf of thrust the engine produces at that flight condition. "Low fan pressure ratio" is the ratio of total pressure across the fan blade alone, before the fan exit guide vanes. The low fan pressure ratio as disclosed herein according to one non-limiting embodiment is less than about 1.45. "Low corrected fan tip speed" is the actual fan tip speed in ft/sec divided by an industry standard temperature correction of [(Ram Air Temperature deg R)/518.7)^0.5]. The "Low corrected fan tip speed" as disclosed herein according to one non-limiting embodiment is less than about 1150 ft/second. Further, the fan 22 may have 26 or fewer blades.

Engines made with the disclosed architecture, and including turbine sections as set forth in this application, and with modifications coming from the scope of the claims in this application, thus provide very high efficient operation, and increased fuel efficiency and lightweight relative to their trust capability.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a fan rotor, a first compressor rotor and a second compressor rotor, said second compressor rotor for compressing air to a higher pressure than said first compressor rotor;
   a first turbine rotor, said first turbine rotor configured to drive said second compressor rotor, and a second turbine rotor, said second turbine configured to drive said first compressor rotor;
   a fan drive turbine positioned downstream of said second turbine rotor, said fan drive turbine for driving said fan rotor through a gear reduction;
   said first compressor rotor and said second turbine rotor configured to rotate as an intermediate speed spool, and said second compressor rotor and said first turbine rotor configured to rotate together as a high speed spool, with said high speed spool and said fan drive turbine configured to rotate in the same first direction, and said intermediate speed spool configured to rotate in an opposed, second direction;
   wherein a power density of the engine is greater than or equal to about 1.5 lbs/in³, and less than or equal to about 5.5 lbf/in³, said power density is defined as a ratio of thrust produced by said engine expressed in pounds force to a volume of a turbine section incorporating each of said first turbine rotor, said second turbine rotor and said fan drive turbine rotor, expressed in cubic inches; and
   wherein said thrust is sea level take-off flat-rated static thrust.

2. The engine as set forth in claim 1, wherein said ratio is greater than or equal to about 2.0.

3. The engine as set forth in claim 1, wherein said ratio is greater than or equal to about 4.0.

4. The engine as set forth in claim 3, wherein said fan rotor is configured to deliver a portion of air into a bypass duct and a portion of air into said first compressor rotor as core flow.

5. The engine as set forth in claim 4, wherein a mid-turbine frame is positioned between said first and second turbine rotors.

6. The engine as set forth in claim 4, wherein a turning vane is positioned between said second turbine rotor and said fan drive turbine.

7. The engine as set forth in claim 1, wherein a mid-turbine frame is positioned between said first and second turbine rotors.

8. The engine as set forth in claim 7, wherein said ratio is greater than or equal to about 2.0.

9. The engine as set forth in claim 7, wherein said fan rotor is configured to deliver a portion of air into a bypass duct and a portion of air into said first compressor rotor as core flow.

10. The engine as set forth in claim 1, wherein said fan rotor is configured to deliver a portion of air into a bypass duct and a portion of air into said first compressor rotor as core flow.

11. The engine as set forth in claim 1, wherein a turning vane is positioned between said second turbine rotor and said fan drive turbine.

12. A gas turbine engine comprising:
- a fan rotor, a first compressor rotor and a second compressor rotor, said second compressor rotor for compressing air to a higher pressure than said first compressor rotor;
- a first turbine rotor, said first turbine rotor configured to drive said second compressor rotor, and a second turbine rotor, said second turbine configured to drive said first compressor rotor;
- a fan drive turbine positioned downstream of said second turbine rotor, said fan drive turbine configured to drive said fan rotor through a gear reduction;
- said first compressor rotor and said second turbine rotor rotating as an intermediate speed spool, said second compressor rotor and said first turbine rotor rotating together as a high speed spool, with said high speed spool and said fan drive turbine configured to rotate in the same, first direction, and said intermediate speed spool configured to rotate in an opposed, second direction;
- said fan rotor being driven by said speed reduction to rotate in said opposed second direction;
- a power density of the engine being greater than or equal to about 1.5 $lbf/in^3$, and less than or equal to about 5.5 $lbf/in^3$; and
- said power density defined as a ratio of thrust produced by said engine expressed in pounds force to a volume of a turbine section incorporating each of said first turbine rotor, said second turbine rotor and said fan drive turbine rotor, expressed in cubic inches.

13. The engine as set forth in claim 12, wherein said ratio is greater than or equal to about 2.0.

14. The engine as set forth in claim 13, wherein said ratio is greater than or equal to about 4.0.

15. The engine as set forth in claim 14, wherein said thrust is sea level take-off flat-rated static thrust.

\* \* \* \* \*